US006971109B1

(12) United States Patent
Williams et al.

(10) Patent No.: US 6,971,109 B1
(45) Date of Patent: Nov. 29, 2005

(54) INTEGRATED APPLICATION MANAGEMENT SYSTEM

(75) Inventors: Robert Williams, Minneapolis, MN (US); Robert Hoffman, Moundsview, MN (US); David M. Weightman, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/122,518

(22) Filed: Jul. 24, 1998

(51) Int. Cl.$^7$ ............................................. G06F 9/46

(52) U.S. Cl. ...................... 719/318; 719/320

(58) Field of Search .................. 709/318; 719/318, 719/320

(56) References Cited

U.S. PATENT DOCUMENTS

| | | | | |
|---|---|---|---|---|
| 5,315,703 | A | | 5/1994 | Matheny et al. ............ 345/700 |
| 5,539,886 | A | * | 7/1996 | Aldred ........................ 709/318 |
| 5,652,888 | A | | 7/1997 | Burgess ...................... 719/318 |
| 5,805,886 | A | * | 9/1998 | Skarbo et al. ............... 719/318 |
| 5,828,882 | A | * | 10/1998 | Hinckley ..................... 709/318 |
| 6,226,693 | B1 | * | 5/2001 | Chow .......................... 709/318 |
| 6,230,160 | B1 | * | 5/2001 | Chan et al. ............. 707/103 X |
| 6,496,872 | B1 | * | 12/2002 | Katz et al. .................. 709/318 |
| 6,532,498 | B1 | * | 3/2003 | Hager et al. ................ 719/318 |

FOREIGN PATENT DOCUMENTS

WO     WO 94/23365     10/1994

OTHER PUBLICATIONS

QUE Corporation, "ActiveX Programming with Visual C++", 1997, Macmillan, Chapter 16—Single-Threading and Multithreading.*
Anonymous, "Customizing the LAN NetView Fix Action Table", IBM Technical Disclosure Bulletin, vol. 37, No. 43, Apr. 1994, pp. 115-116.*

* cited by examiner

*Primary Examiner*—Meng-Al T An
*Assistant Examiner*—Li Zhen
(74) *Attorney, Agent, or Firm*—Dorsey & Whitney LLP

(57) ABSTRACT

A method and system for coordinating the simultaneous execution of computer programs on a computer system. A set of key events that describe certain states and conditions that can be generated during execution of the computer programs are stored in a database, along with a set of commands for each computer program that can be accepted and executed by that computer program in response to each of the key events. When a computer program generates a state or condition during execution that corresponds to a key event, the computer program sends a notification of the occurrence of the key event to a coordination module. The coordination module then retrieves from the database the commands to be executed by each of the computer programs, and sends the retrieved commands to the computer programs for execution.

23 Claims, 17 Drawing Sheets

INTEGRATED APPLICATION MANAGEMENT SYSTEM

TECHNICAL FIELD

The present invention relates to application program interoperability and, in particular, to a user configurable program that manages concurrently-executing application programs.

BACKGROUND OF THE INVENTION

The personal computer ("PC") has, during the past decade, evolved into a useful and relatively usable electronic home appliance. The increasing usefulness of PCs in the home has arisen both from the development of powerful application programs like, for example, graphics-oriented word processing applications and Internet browsers, as well as from an increased connectivity to, and compatibility with, other common household electronic appliances, including telephones, answering machines, fax machines, CD players, and televisions. The PC is thus evolving into a central management device for managing operations of many types of consumer electronic devices, as well as providing a powerful computational platform on which sophisticated consumer-oriented application programs can be run. The increasing usability of PCs has arisen from the adoption by both operating systems and application programs that provide user-friendly, graphical user interfaces. Users are now able to launch and control sophisticated programs using mouse and minimal keyboard input to simple and uniformly presented graphical displays comprising graphical pushbuttons, pull-down menus, and other easy to use graphical controls.

Numerous separate application programs that interface to, and control, external peripheral devices have become commonly available. These applications include, for example, application programs that provide a graphical user interface to a telephone answering machine. The CD-ROM drives that are now provided as a standard feature of PC systems can play recorded music CDs through speakers attached to a PC system, and application programs have been developed to facilitate play of recorded music CDs. Television application programs have been developed that allow a user to view live television broadcasts in a multimedia window displayed on the monitor attached to the PC. Telephone monitoring applications have been developed to run on a PC that allow a user to accept and conduct telephone calls through the microphone and speakers that come standard with modern PCs.

Although great strides have been made in increasing the usefulness of home PCs, certain usability problems remain. One significant usability problem is that of coordinating concurrently executing application programs, so that the PC, and the applications executing on the PC, present a seamless, internally-coordinated system that behaves as a user desires and expects an integrated system to behave.

One aspect of this usability problem is that of implementing application programs to control and interface with external devices such that the application programs can intelligently interoperate during concurrent execution. As an example of the need to coordinate concurrently-executing application programs, consider a scenario where a PC user has launched a telephone application that monitors the user's telephone line for incoming calls and is, at the same time, either watching a television program on the PC or listening to a recorded music CD that is being played by the PC. An incoming telephone call may cause the telephone application program to signal the incoming call to the PC user through either a simulated ringing sound, some sort of graphically displayed indication, or both. These audio or visual signals from the telephone application may interrupt or interfere with the user's watching of the television program. For example, the telephone application may bring up an information window that displays options for the user's response to the incoming telephone call, including answering the call directly, ignoring the call, or forwarding the call to the answering machine. If this display window overlaps or conceals the window through which the television program is being broadcast, the user may miss a portion of the broadcast, and may be required to manipulate the mouse or keyboard in order to respond to the telephone application program or in order to bring the television window back to the forefront of the display screen. In similar fashion, any of the many possible concurrently-executing application programs may respond to outside events, or to user or program-generated events, in such a way as to interfere with other concurrently executing applications.

It is theoretically possible to build integrated applications that can detect each others' runtime activities in the PC and attempt to coordinate those activities. Practically, however, constructing such integrated applications is nearly impossible. Applications may be developed by many different entities, such as individuals or companies. These different development entities generally have no way of knowing what kinds of activities to expect from application programs developed by other entities, and the development entities generally have no means for establishing communications between the various application programs at runtime. A need has therefore been recognized for a technology that can be employed to coordinate the activities of concurrently-executing application programs so that they do not interfere with each other during execution and so that the concurrently executing programs cooperate one with another to provide a unified and easily managed system of cooperating application programs to the PC user.

SUMMARY OF THE INVENTION

Embodiments of the present invention provide a method and system for coordinating the concurrent execution of computer programs on a computer system. In one embodiment, a set of key events that describe certain states and conditions that can be generated during execution of the computer programs are stored in a database, along with a set of commands for each computer program that can be accepted and executed by that computer program in response to each of the key events. When a computer program generates a state or condition during execution that corresponds to a key event, the computer program sends a notification of the occurrence of the key event to a control module. The control module then retrieves from the database the commands to be executed by each of the computer programs and sends the retrieved commands to the computer programs for execution. A computer user may interact with a graphical user interface to configure the system of concurrently executing computer programs by choosing one or more commands to be executed by each computer program upon the occurrence of a key event.

DETAILED DESCRIPTION OF THE INVENTION

Figure 1:
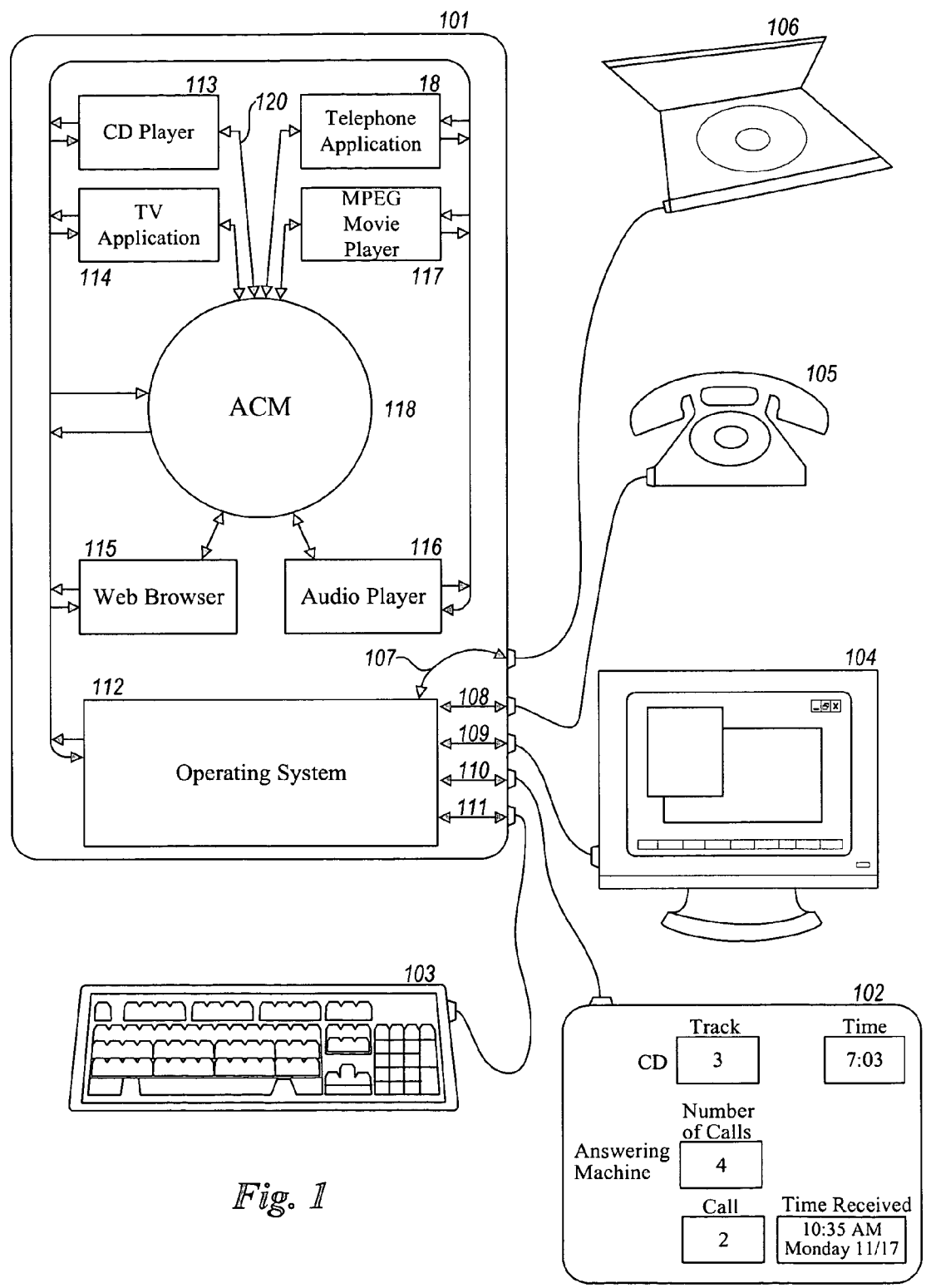
FIG. 1 displays a schematic overview of one embodiment of the integrated application management system.

Embodiments of the present invention provide a method and system for integrating and managing application programs running on a computer system that comply with simple interface standards expected by the integration and management system. These embodiments provide a computer system user with the ability to configure interactions between compliant application programs so that they interoperate in a manner desirable to the user. These embodiments allow a computer system user to examine a list of compliant applications programs installed on the computer system. The list includes, for each application program, a sublist of the key events that may arise during execution of the application program, and a sublist of various tasks or commands that the application can perform at the request of the below-described integrated application management system ("IAMS") that represents one embodiment of the present invention.

These lists of compliant application programs, including the commands that each application program can perform and the key events that can arise during execution of each application program, may be displayed to the user through a graphical user interface that allows the user to specify the commands that each application program should perform in response to the occurrence of each key event. For example, if a telephone application program may receive incoming phone calls, the occurrence of an incoming phone call may appear as a key event associated with the telephone application program. The user may specify that the telephone application program perform an answer command in response to the incoming phone call key event. The user may also specify that an MPEG movie viewing application perform a stop or pause command in response to the incoming phone call key event. When the user is later watching a movie displayed on the computer system and a phone call is concurrently received by the computer system, the IAMS issues an answer command to the telephone application and a stop or pause command to the MPEG movie viewing application. As a result, the system responds to the incoming phone call in the user-friendly manner that the user specified earlier through the graphical user interface, namely, the MPEG movie pauses to allow the user to accept the incoming phone call. The IAMS thus runs in the background, coordinating interoperation of the various compliant applications concurrently running on a computer system.

The IAMS may be hard-coded to contain a list of compliant application programs, along with sublists corresponding to each entry in the list of compliant application programs that contain the key events generated, and commands implemented, by each application program. Alternatively, the IAMS may identify each compliant application program and the key events generated, and the commands implemented by, each of the identified compliant application programs at run time. This information obtained at run time may be retrieved by the IAMS directly from compliant application programs through standard run time interfaces supported by each of the compliant application programs. As a third alternative, this information may instead be placed in the Windows registry by each compliant application program and subsequently retrieved by the IAMS from the Windows registry. The Windows registry is provided by Microsoft Corporation's Windows operating system. The latter two alternatives provide great flexibility to the user, allowing the user to incorporate a new compliant application program into the coordinated system of application programs managed by the IAMS without requiring the user to obtain a new IAMS or performing a complicated reconfiguration of the IAMS.

The IAMS comprises a main user interface ("MUI"), a user preference application ("UPA"), an application control module ("ACM"), and a number of cooperating applications that include a minimal amount of logic and interprocess communication support for interfacing to the ACM. The MUI allows the user to launch one or more of the compliant application programs and to launch the UPA. Using the UPA, a user is able to configure a cooperating application program to respond in certain well-defined ways to internal key events generated by the application program as well as to external key events generated by other, compliant application programs. While the application programs are executing, they export internally generated key events to the ACM and receive from the ACM, in return, commands that indicate to the application programs how they should respond to the events. Thus, the IAMS provides to a user the ability to configure the various compliant application programs to respond in certain well-known ways to each different type of key event that can be generated by that application program, or any other compliant application program, and the ACM provides a mechanism by which each application program is notified of the responses to key events that are expected of that application during its execution.

The embodiment described below is implemented to run on personal computers under the Windows operating system and makes use of the Microsoft Component Object Model ("COM") ("Inside OLE," 2nd Edition, Kraig Brockschmidt, 1995), to communicate between application programs and the ACM. An integrated application management system ("IAMS") can, however, be implemented on many different types of multitasking operating systems and hardware platforms.

FIG. 1 displays a schematic overview of the IAMS. The IAMS runs within a personal computer 101 having a LCD front panel display 102 that displays information concerning the status of attached peripheral devices like phone answering machines and CD players, an attached keyboard 103, a display monitor 104, a telephone line 105, and a DVD drive 106. Note that the telephone line 105 generally includes either an external or internal modem, not shown in FIG. 1. The various input and output devices, including the keyboard, display monitor, front panel display, telephone line, and DVD drive, are electronically connected with the PC through hardware controllers, represented by double arrows 107–111, to hierarchical device-driving and data exchange components of the operating system of the personal computer 112. The multitasking operating system 112 supports concurrent execution of a CD player application 113, a television application 114, a web browser 115, an audio player 116, an MPEG movie player 117, and a telephone application 118. These simultaneously executing application programs interface to still another executing process, the ACM 118, through which the application programs coordinate their activities. Each of the application programs, as well as the ACM, communicates and exchanges data directly with the operating system, indicated in FIG. 1 by the system of connected, single-lined arrows 119. Each application program communicates directly with the ACM using COM, indicated in FIG. 1 by double-lined arrows, including double-line arrow 120. A user of the personal computer may interact directly with the ACM and with each of the application programs by means of graphical user interfaces displayed on the display monitor screen 104. Applications generate graphical user interface displays through operating system calls and receive user input to those graphical user interfaces in the form of event messages generated by the operating system.

The ACM functions as a central hub within the personal computer through which application programs communicate with one another and through which a user configures and controls the behavior of the application programs. A user is thus able to configure and control the entire system of communicating applications primarily through the single graphical user interface presented by the IAMS. In a computing environment lacking an IAMS, the user is required to individually control and configure each application program through graphical user interfaces tied specifically to each application program, and applications programs, in general, have no way for coordinating their own activities with those of other application programs. In such environments, the user cannot specify coordinated, system-wide application program behavior.

Figure 4:
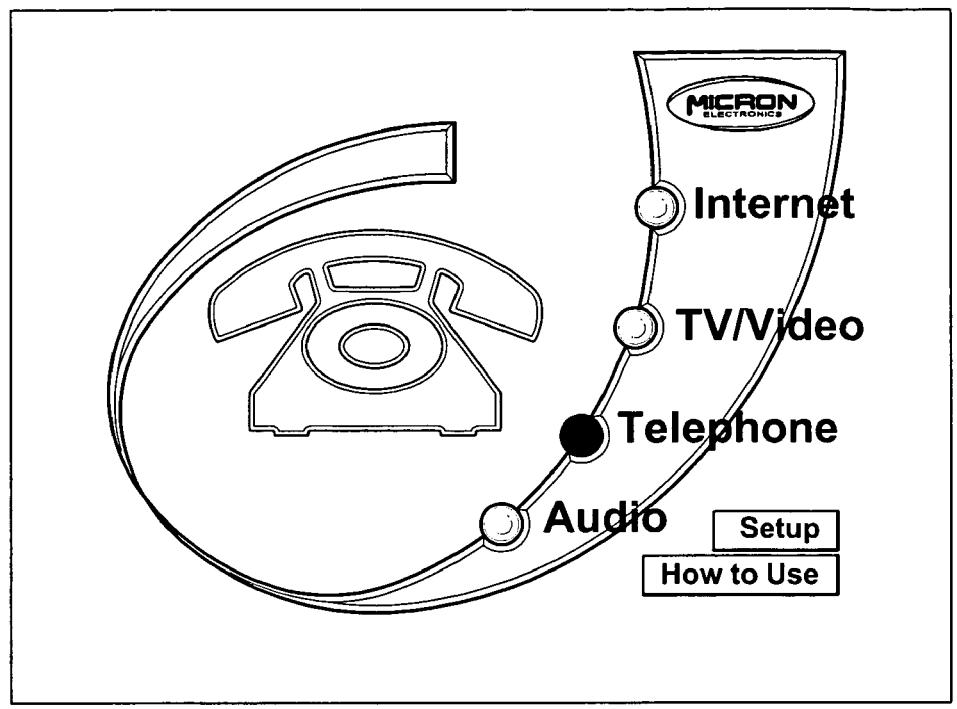
Figure 5:
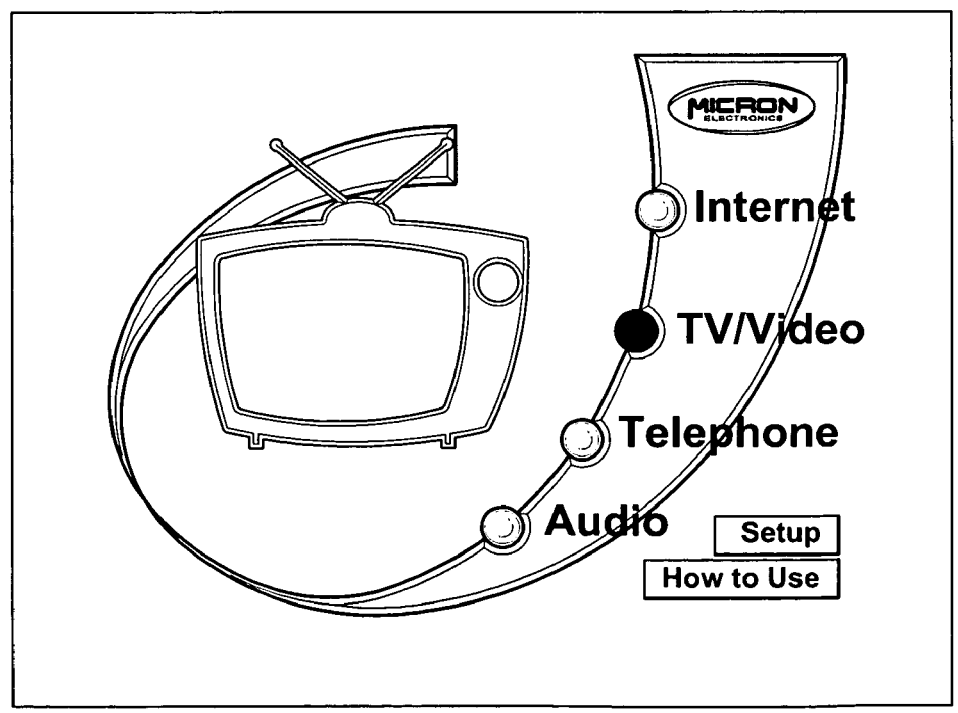
Figure 6:
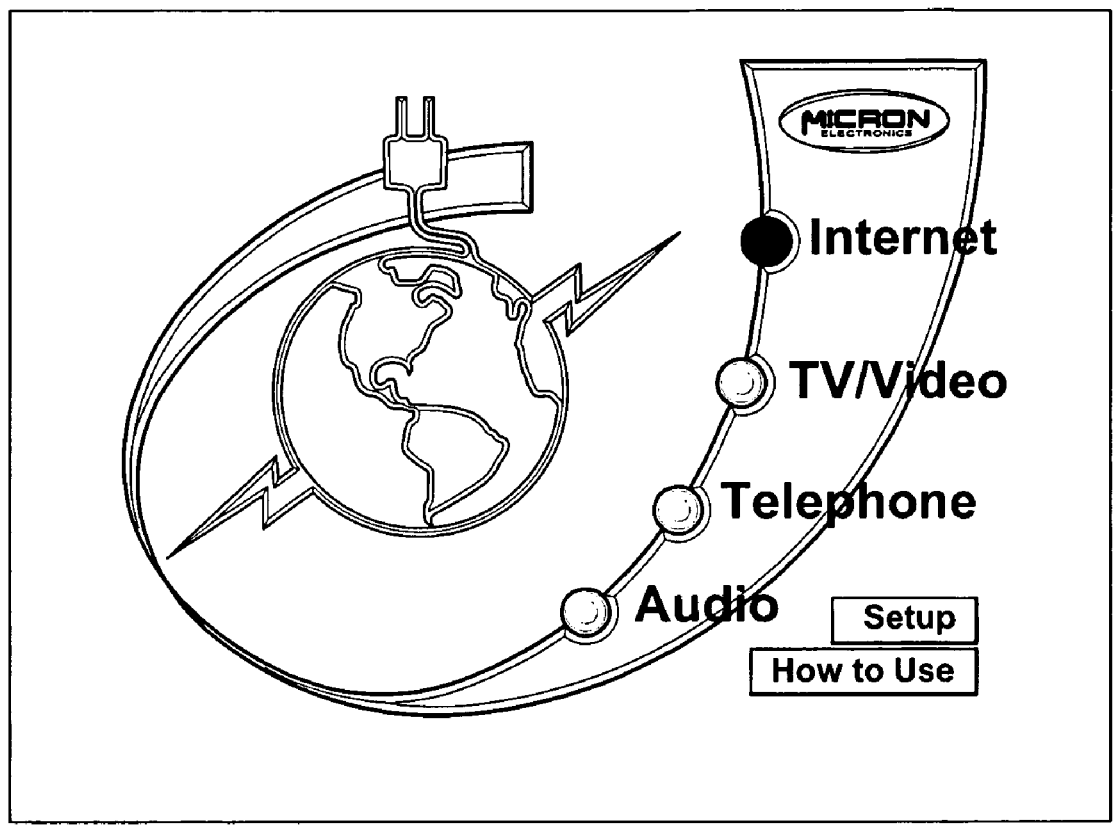

The MUI provides a single user interface through which a user can launch the compliant applications and launch the user preference application ("UPA"). FIGS. 2–6 display features of the highest-level menus or interface. The highest-level menu or screen display presented to the user by the MUI is shown on FIG. 2. The highest-level menu contains headings for the four main application program areas including "Audio" 201, "Telephone" 202, "TV/Video" 203, and "Internet" 204. In addition, the highest-level menu includes options to launch the setup program 205 and a help program 206. When a user manipulates the mouse 50 so that the cursor overlies one of the four application areas on the highest-level menu, the button or light associated with that application area changes color, and a large icon that represents that application area is displayed in the center of the menu. For example, in FIG. 3, the cursor overlays the "Audio" application area resulting in the light 301 associated with the "Audio" application area to change color and the large CD icon 302 to be displayed. FIGS. 4–6 show the appearance of the high level menu when the cursor is placed over the "Telephone," "TV/Video," and "Internet" application areas, respectively.

Figure 2:
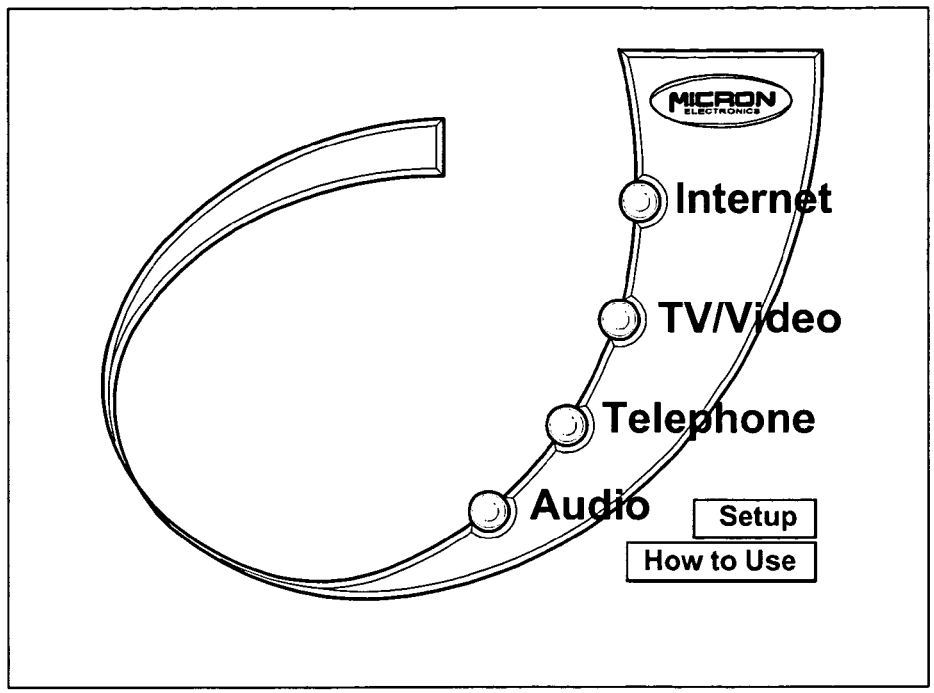
FIGS. 2–6 display examples of features of the highest-level menus of the graphical user interface of the integrated application management system.
Figure 3:
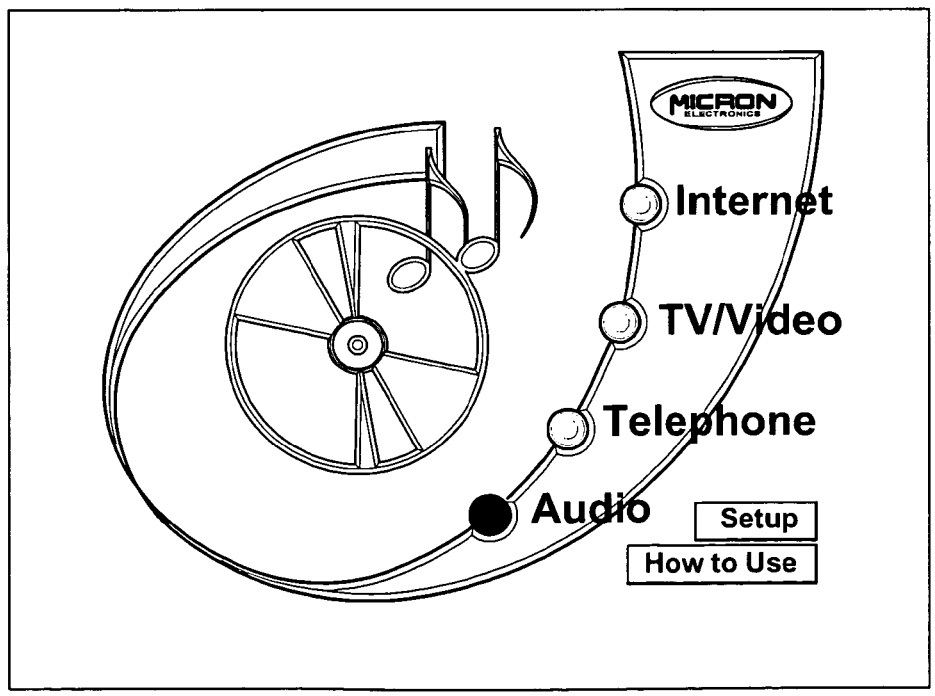
Figure 7:
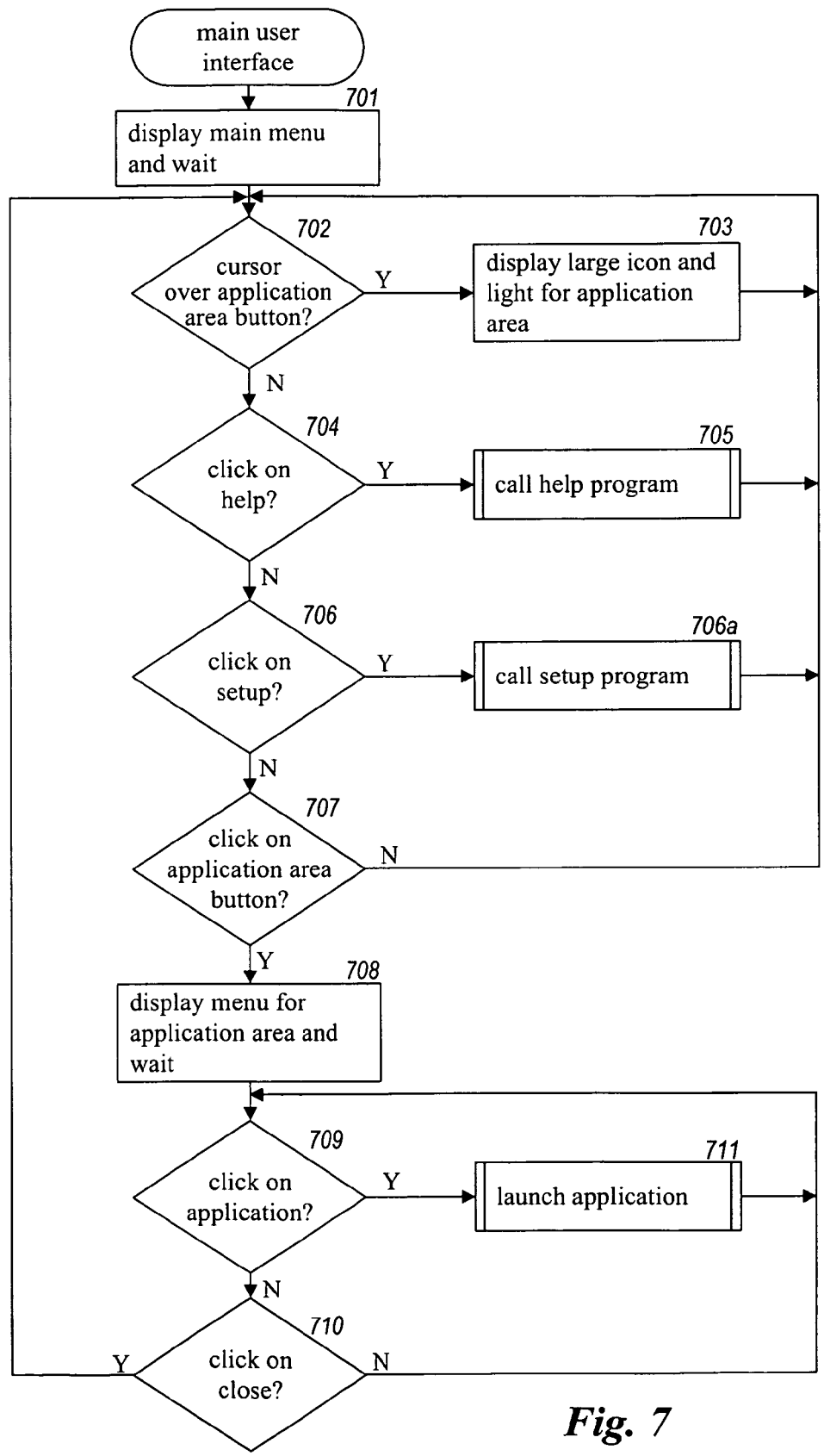
FIG. 7 displays a flow control diagram for the main user interface.

FIG. 7 displays a flow control diagram for the MUI. The MUI accesses a central registry to identify the compliant application programs and allows the user to select which compliant application programs to launch. In step 701, the MUI displays the main menu as shown in FIG. 2. The MUI then waits for user input to that main menu and responds to the user input according to the remaining steps 702–711. When the user manipulates the mouse, or other input device, to effect input to the main menu, the MUI is awakened and control proceeds to step 702. In step 702, the MUI determines whether the user has placed the cursor over one of the four application area headings or buttons. If so, then, in step 703, the MUI displays the corresponding large icon for the application area and changes the color of the light associated with the application area, as shown in FIGS. 3–6. If the cursor has not been placed over an application area button, then, in step 704, the MUI determines whether the user has clicked on the help selection of the main menu. If so, then the MUI calls the help program in step 705. If the user has not clicked on the help selection, then, in step 706, the MUI determines whether the user has selected the setup selection from the main menu. If so, then in step 707, the MUI launches the UPA, to be discussed below, which allows the user to configure the behavior of the application programs. If the user has not selected the setup selection, then in step 707, the MUI determines whether the user has selected one of the application areas. If not, then control returns to the wait state following step 701, where the MUI waits for another user input. If, on the other hand, the user has selected one of the application areas from the main menu, then in step 708, the MUI displays a submenu or application-area specific menu associated with that application area and then waits for additional user input. If a user clicks on one of the application icons or selections displayed within the application-area specific menu, then in step 709, the MUI detects that selection and, in step 711, the MUI launches that particular application program. If, on the other hand, the user selects the close option from the application area specific menu, as detected in step 710, then control returns to the wait state following step 701, where the MUI waits for further user input.

The configuration information for the various application programs within the IAMS is stored within a database. In one embodiment of the IAMS, the configuration information is stored in the Windows registry, a hierarchical database implemented within the Windows operating system. The configuration information consists essentially of pairs of key events and commands. A key event is specified by the name of the application program that will receive the key event appended to the name of the key event. This application program/key event designation is associated in the Windows registry with the name of the command that the receiving application program is configured to execute in response to the key event.

Thus, in the registry, the name of a command is stored for each key event received by each application program. For example, the telephone application may generate a "Telephony Voice Ring In" key event corresponding to detection of an incoming telephone call. Each application that will run under the IAMS will then have, in the registry, a value for the "Telephony Voice Ring In" key event that consists of a command that that application should execute upon notification by the ACM of the occurrence of a "Telephony Voice Ring In" key event. The CD playing application may, for example, be instructed to execute a pause command in response to the "Telephony Voice Ring In" key event. In that case, the registry will contain the following name-value pair: CD player/Telephony Voice Ring In-pause. The telephone application, on the other hand, may be configured to answer incoming calls. In this case, the registry will further include the following name-value pair: telephone/Telephony Voice Ring In-answer call.

The current configuration for the application programs is stored within the registry within a named hierarchy such as "current configuration." Additional configurations can be stored in separate files or under separately named hierarchies within the registry as named alternative configurations that can later be designated as the current configuration by the user.

Figure 8:
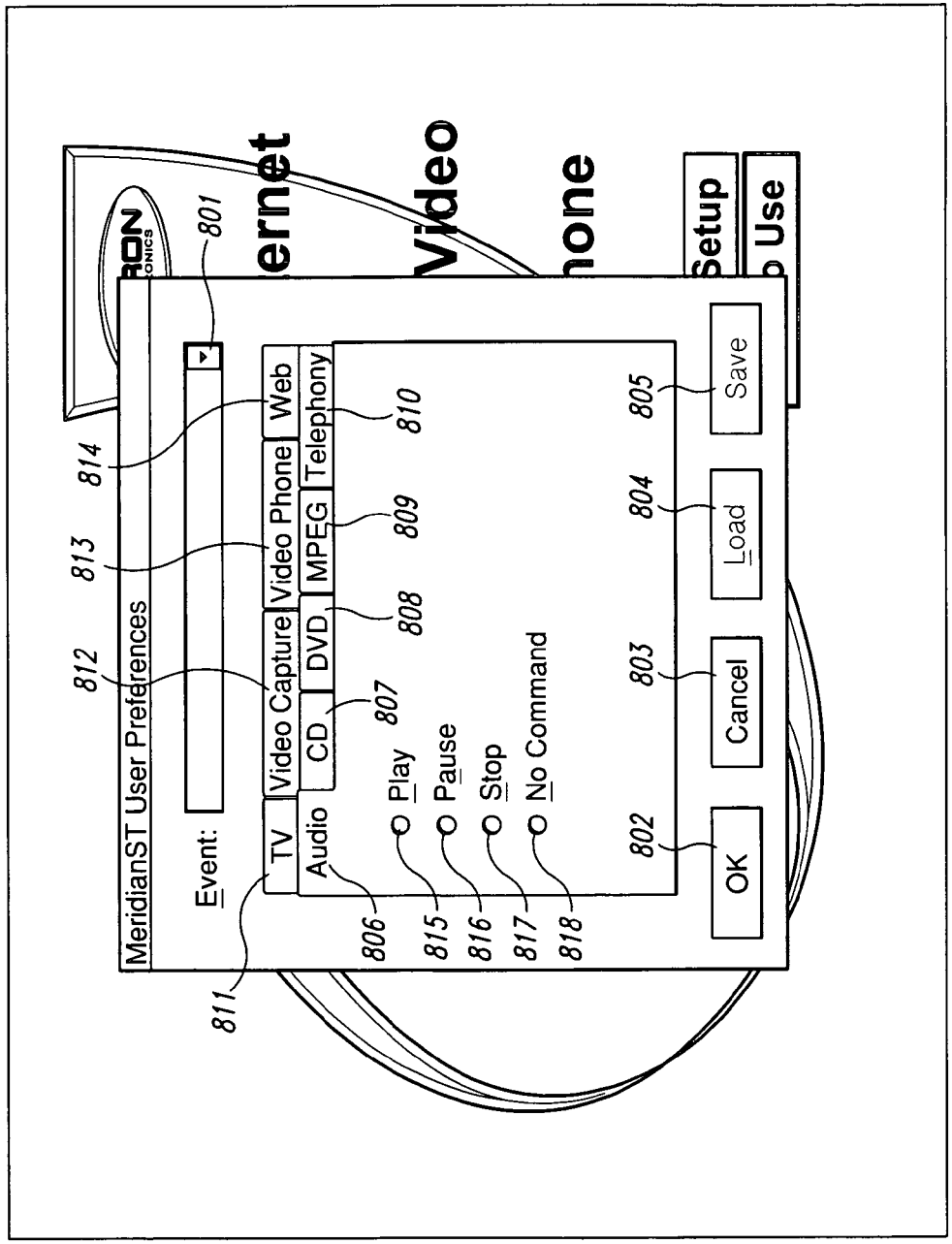
FIGS. 8–13 display examples of setup graphical user interface operations.
Figure 9:
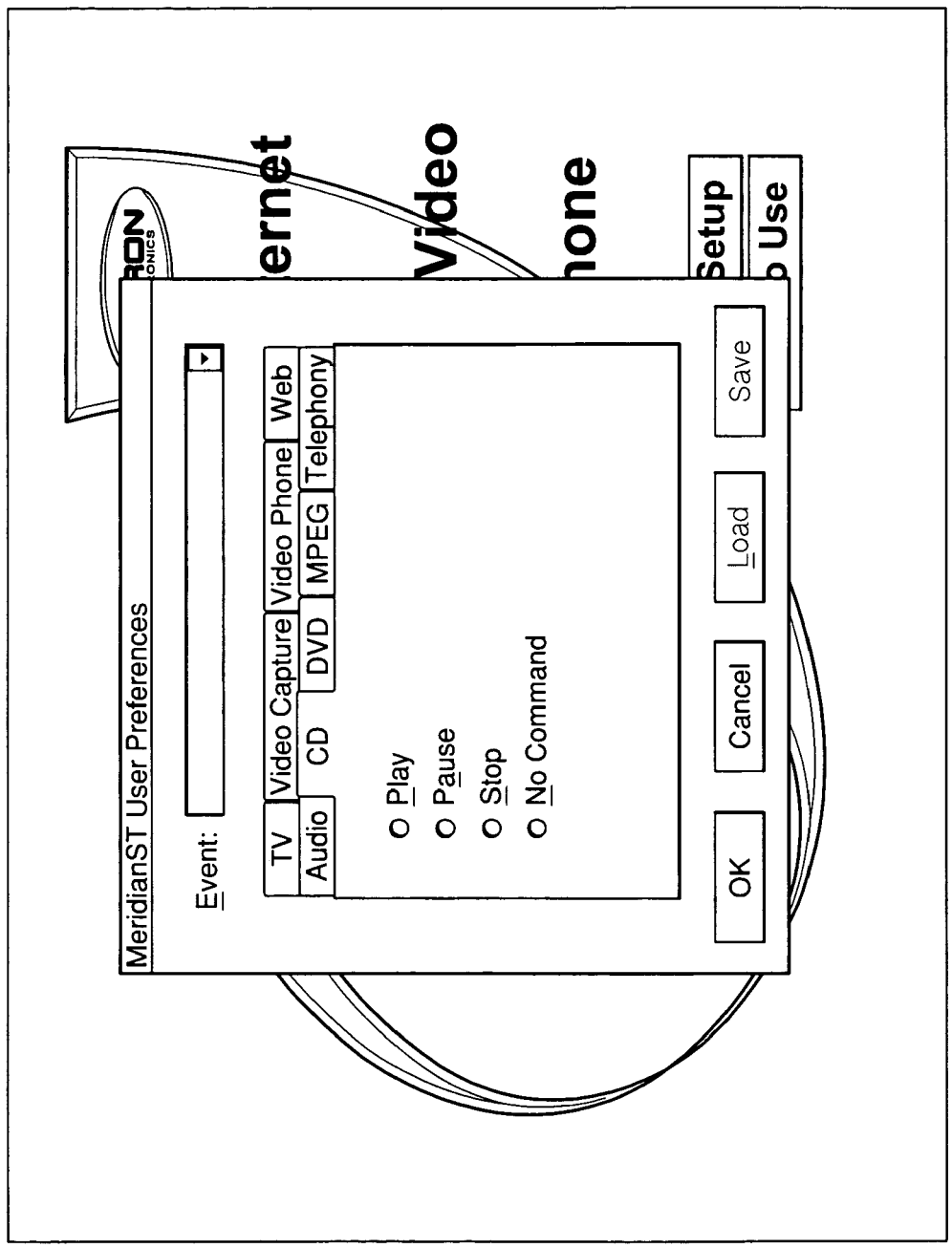
Figure 10:
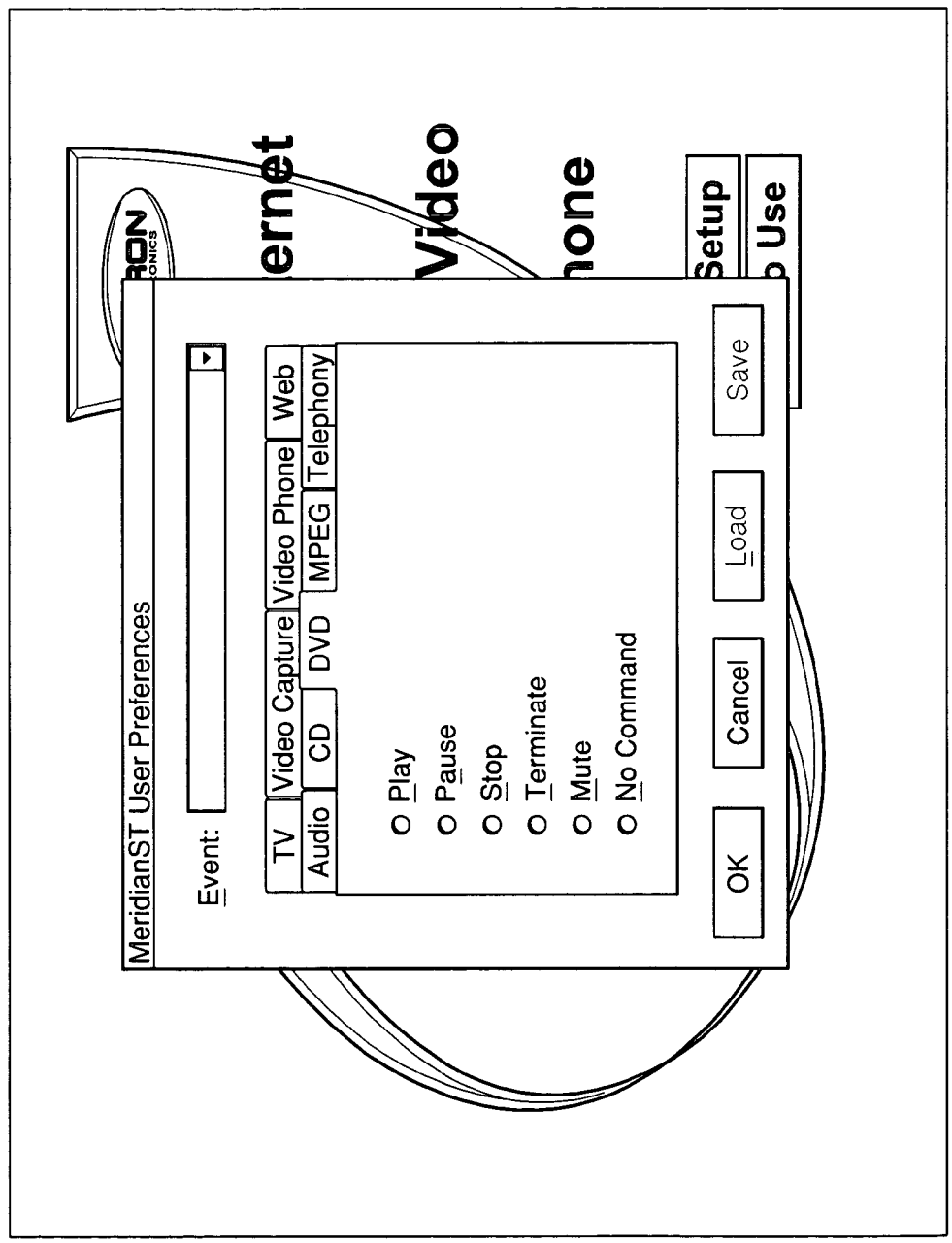

The above-described configuration information is specified by a computer user through the user preferences application ("UPA") that is launched by selection of the setup selection from the main menu. FIGS. 8–13 display examples of setup graphical user interface operations for the UPA. FIG. 8 displays the setup window that appears overlaid on top of the main menu when a user selects the setup option from the main menu. The setup window includes a drop-down list 801 and control buttons 802–805 for updating the current configuration, quitting from the setup program, loading a previously stored configuration, and saving a configuration, respectively. In the center of the setup menu are nine tabulated command forms corresponding to nine different supported application programs 806–814. In FIG. 8, the tabulated form corresponding to the audio application program has been selected for display and overlays the other eight tabulated command forms. The displayed audio command form includes radio buttons for the four possible commands accepted by the audio application program: Play 815, Pause 816, Stop 817, and No Command 818.

By clicking on one of the tabulated form headings, the user can display the commands associated with the corresponding application program. For example in FIG. 9, the user has selected the CD tabulated form and, in FIG. 10, the user has selected the DVD tabulated command form.

Figure 11:
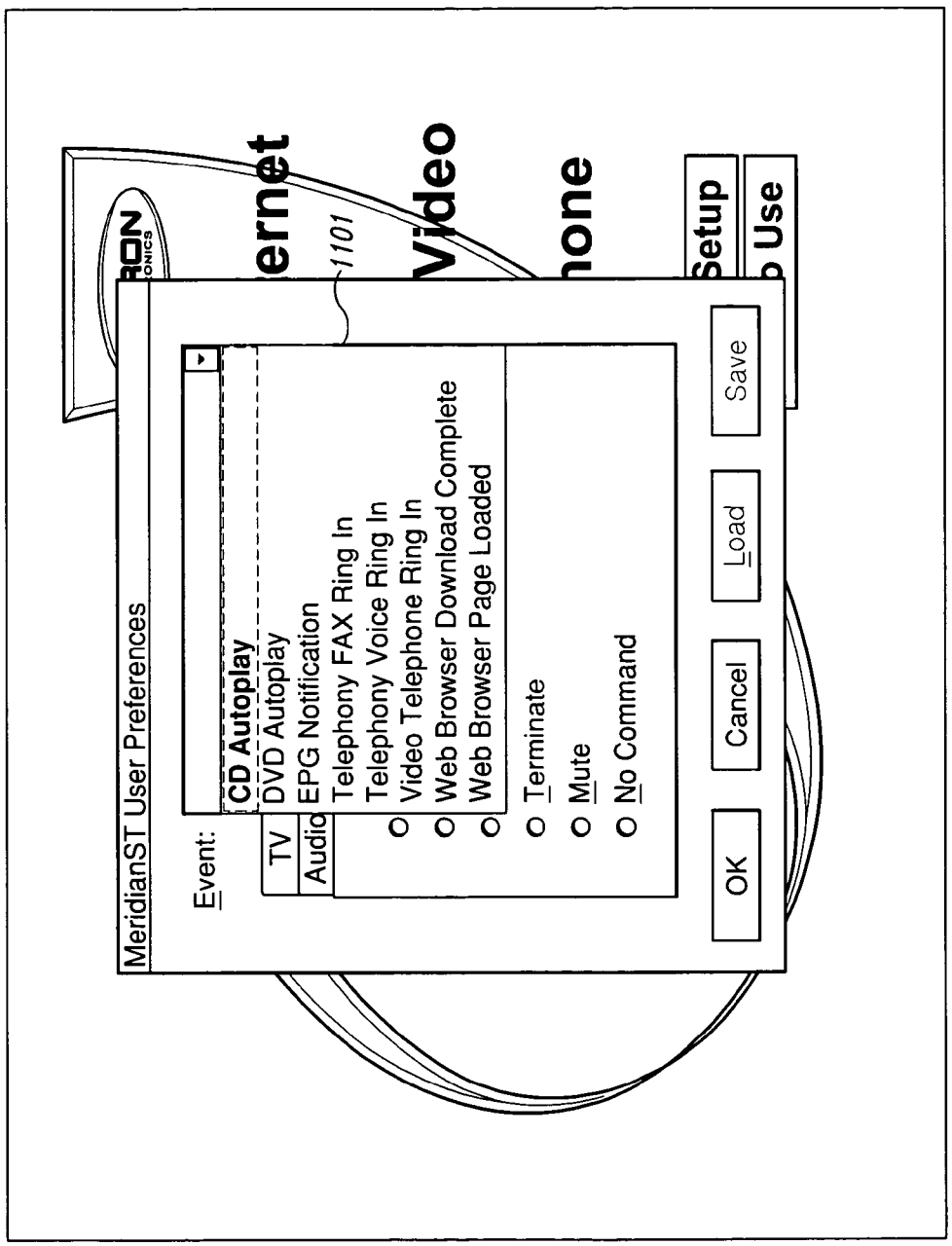
Figure 12:
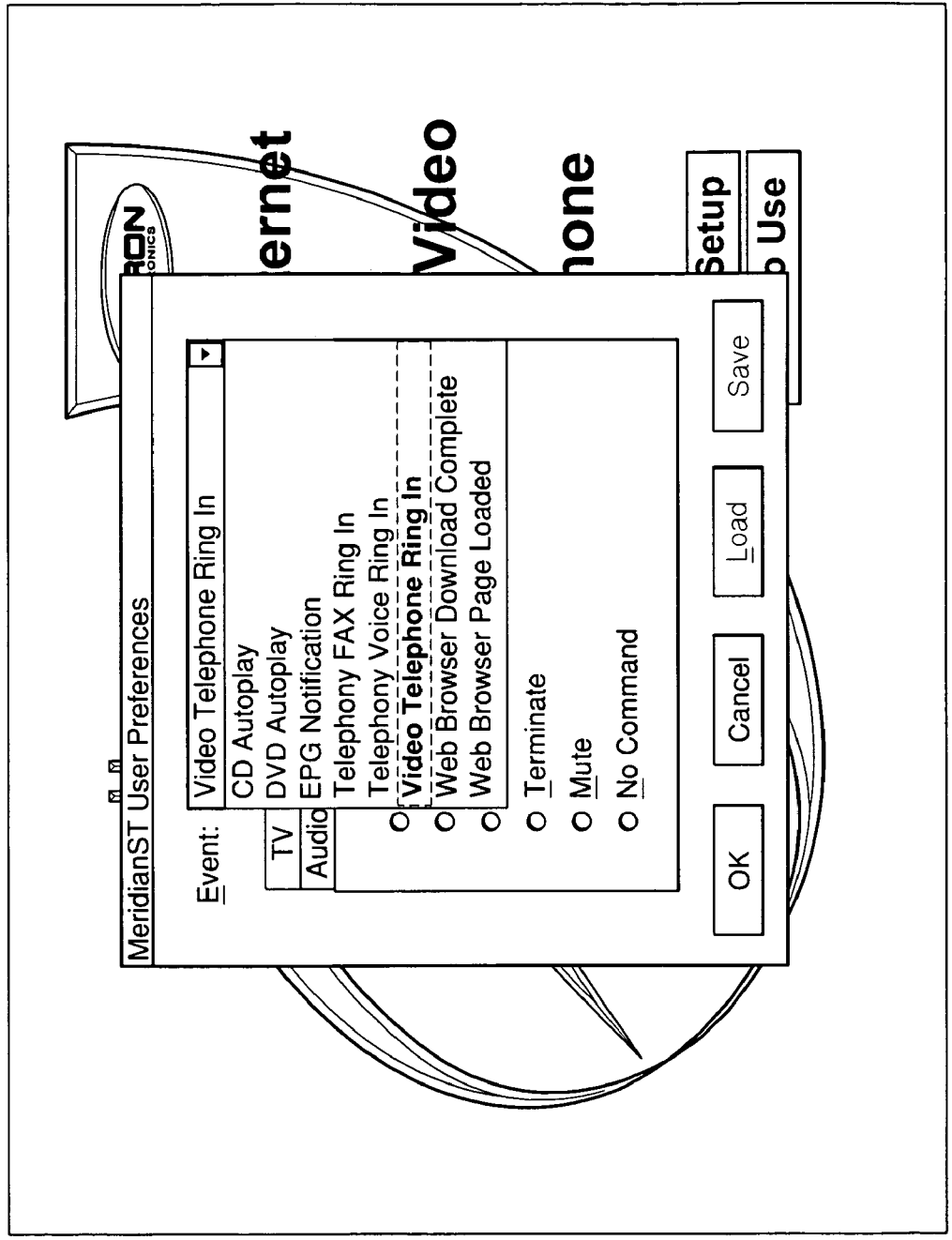
Figure 13:
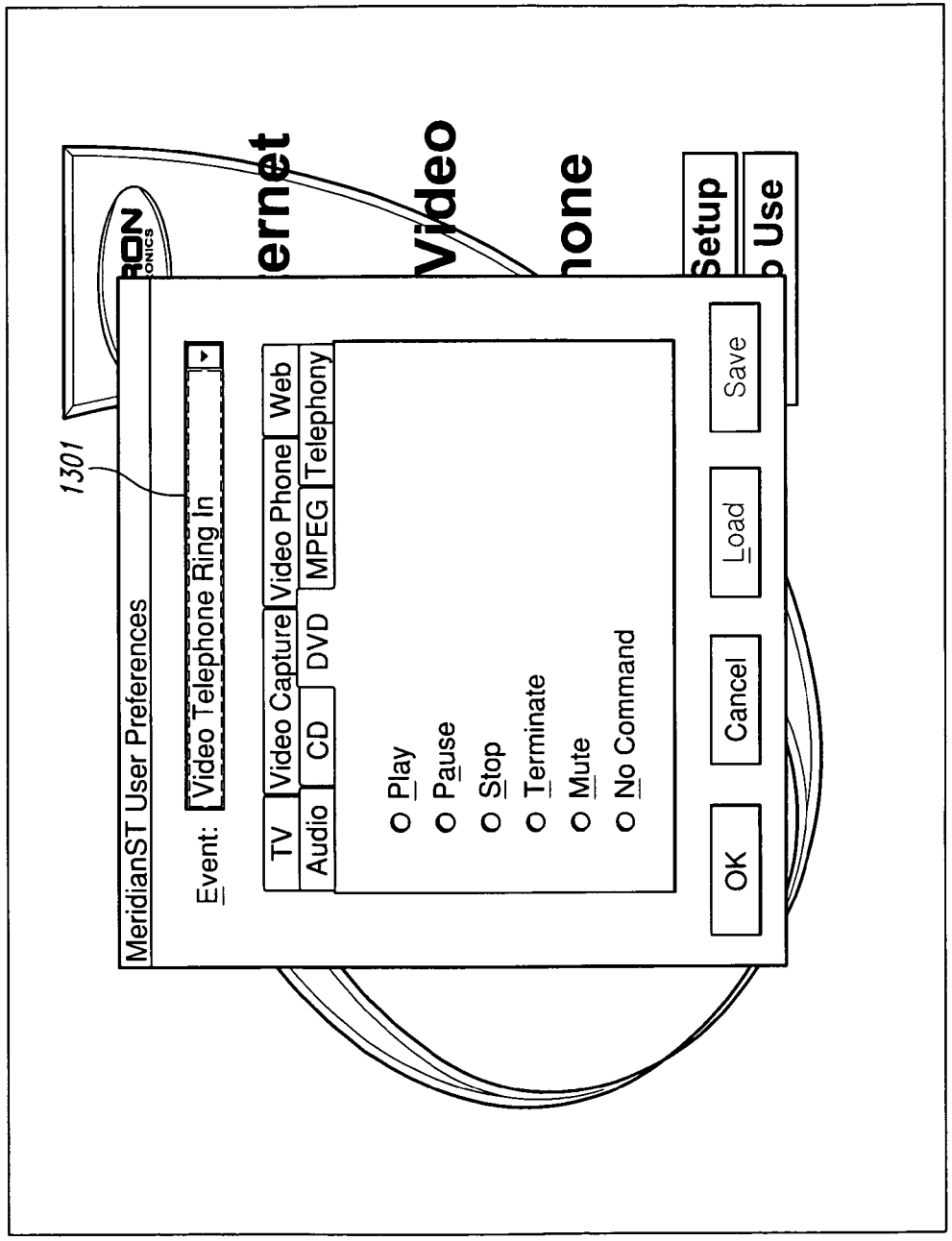

When the user selects an event from the dropdown list 801 on the setup graphical user interface, a list 1101 of possible key events that can be generated by all of the application programs included in the IAMS is overlaid on top of the setup window, as shown in FIG. 11. As described above, these key events may be hard-coded in the IAMS, or obtained by the IAMS at run time either directly from the application program or from the Windows registry. The user may select any one of these key events with a mouse click, as shown in FIG. 12, where the user has selected the key event "Video Telephone Ring In." When the user has selected a key event, the list of key events is removed and the selected key event 1301 appears in the event window bar, as shown in FIG. 13.

A user may use the mouse to click on any of the commands displayed on the tabulated form for a particular application. A selected command is indicated by a small black dot appearing in the radio button associated with the command, as, for example, in FIG. 14, where the "Send Call to Voice Mail" command 1401 has been selected on the tabulated command form for the video phone application. By selecting each different key event in succession and, for each key event, selecting a command from each tabulated command form, a user can specify the entire configuration for application interoperation under the IAMS system. When the user presses the OK button 1402, all the selections of command corresponding to applications and key events made by the user during the most recent instantiation of the setup window are saved to the registry, as described above. When the user selects the cancel button 1403, the setup program terminates without changing the registry. When the user selects the load button, an additional window is displayed that allows a user to specify a stored configuration file which is then read into memory and, from memory, into the registry by the setup program. When the user selects the save button 1405, the setup program displays an additional window that allows a user to specify the name for the configuration specified in the most recent instantiation of the setup window, and that specification is then stored under the specified name either in a file or in the registry for later retrieval using the load button 1404.

Figure 15:
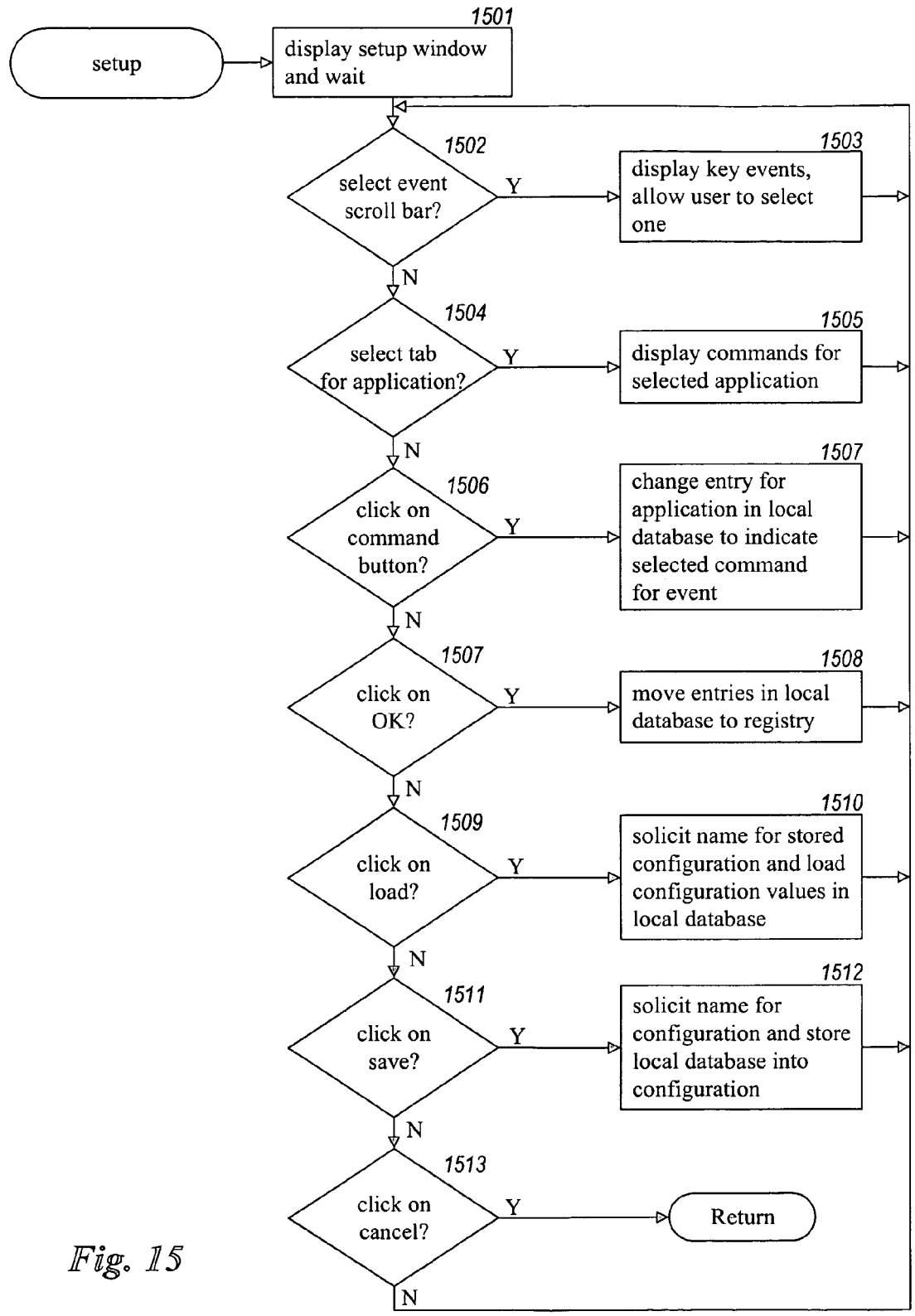
FIG. 15 displays a flow control diagram for the setup program that is called in response to user selection of the setup option from the main menu.

FIG. 15 displays a flow control diagram for the UPA (i.e., "the setup program") that is called in response to user selection of the setup option from the main menu. In step 1501, setup displays the setup window shown in FIG. 8. Setup then waits for user input. Steps 1502–1504 represent a "case" or "switch" statement by which setup evaluates and responds to each user input. When the user effects input to setup through the setup graphical user interface, setup leaves the wait state 1501 and begins execution at step 1502. In step 1502, setup determines whether the user has selected the event scrollbar. If so, then in step 1503, setup displays all the possible key events in the scrollbar and allows the user to select one of the key events for display in the event scrollbar. Setup may access a hard-coded list of key events or may access a list of key events built by the IAMS at run time through standard interfaces supported by each application program or by retrieving the key events from the Windows registry. If the user has not selected the event scrollbar, then, in step 1504, setup determines whether the user has selected one of the tabs of a tabulated command form. If so, then in step 1505, the setup displays the tabulated command form associated with the tab selected by the user. If the user has not selected a tab, then, in step 1506, subset determines whether the user has clicked on one of the radio buttons associated with a particular command. If so, then in step 1507, subset selects that command and makes note of the selection to that state either in memory or in a local database, so that the registry can be later updated if the user chooses to do so. If the user has not clicked on a command radio button, then, in step 1507, subset determines whether the user has clicked on the OK button. If so, then, in step 1508, subset transfers all selections made by the user during the current instantiation of the setup program from memory or a local database to the registry. If the user has not clicked on the OK button, then in step 1509, subset determines whether a user has clicked on the load button. If so, then, in step 1510, subset solicits from the user a name for a stored configuration and loads the stored configuration either into memory or into a local database, as if the user had made those selections through the setup menu during the current instantiation of the setup window. If the user did not select the load button, then, in step 1511, setup determines whether the user has clicked on the save button. If so, then, in step 1512, setup solicits from the user a name for a stored configuration and stores all the selections currently residing in memory or in a local database into that stored configuration, either in a separate file or under a different hierarchical classification within the registry. The stored configuration can later be retrieved by the user by selecting the load button from the setup menu, described above starting at step 1509. If the user has not clicked on the save button then, in step 1513, setup determines whether the user has selected the cancel button. If so, then in step 1514, setup returns. If not, then control returns to the wait state following step 1501, where setup waits for further user input.

Table 1, below, shows examples of the various different application programs that may be in the IAMS.

TABLE 1

| | |
|---|---|
| DVD Player | Plays DVD disks through speakers and monitor of a PC. |
| Audio Player | Plays ".WAV" files and other stored audio data through speakers attached to PC. |
| CD Player | Plays recorded-music CDs through speakers attached to PC. |
| MPEG Movie Player | Provides display of MPEG-recorded movies. |
| Video Capture | Provides recording of video data to PC data storage devices. |
| Television Application | Provides television broadcast reception and display on a PC. |
| Electronic Program Guide (EPG) | Provides a television programming schedule. |
| Telephony | Provides audio telephone calls through a PC and attached peripherals. |
| Video Telephone | Provides both visual and audio data exchange in the context of telephone communications. |
| Web Browser | Provides navigation to, and display of, graphical Internet pages. |

In Table 2, below, are shown the various key events generated by each of the application programs described in Table 1, as well as the commands supported by each of the application programs. Each application program may also generate a "status" key event so that the ACM can synchronize its display with the application programs.

TABLE 2

| Application | Key Events | Commands |
|---|---|---|
| DVD Player | Autoplay Triggered | PLAY STOP TERMINATE PAUSE MUTE FAST FORWARD REWIND SEEK FULLSCREEN WINDOWED MAXIMIZE MINIMIZED ROOTMENU EJECT NO COMMAND |
| Audio Player | (none) | PLAY STOP PAUSE FAST FORWARD REWIND RECORD NEXT TRACK PREVIOUS TRACK SEEK NO COMMAND |
| CD Player | Autoplay Triggered | PLAY STOP PAUSE FAST FORWARD REWIND NEXT TRACK PREV TRACK SEEK EJECT NO COMMAND |
| MPEG Movie Player | (none) | PLAY STOP PAUSE MUTE FAST FORWARD REWIND SEEK NO COMMAND |
| Video Capture | (none) | START STOP PAUSE NO COMMAND |
| Television Application | (none) | START STOP MUTE CHANGE CHANNEL UP CHANGE CHANNEL DOWN SELECT CHANNEL NO COMMAND |
| Electronic Program Guide (EPG) | SELECTED PROGRAM STARTING | DELAY NOTIFICATION START SELECTED PROGRAM BECOME ACTIVE APP NO COMMAND |
| Telephony | VOICE RING IN FAX RING IN | ANSWER CALL IGNORE CALL SEND CALL TO VOICE MAIL FAX ANSWER FAX IGNORE NO COMMAND |
| Video Telephone | RING IN | ANSWER IGNORE CALL SEND CALL TO VOICE MAIL NO COMMAND |
| Web Browser | PAGE LOADED DOWNLOAD COMPLETE | BECOME ACTIVE APP LOAD PAGE NO COMMAND |

Table 3, shown below, includes an example configuration that may be specified by a user.

TABLE 3

| Application | Key Event | Command |
|---|---|---|
| DVD Player | AUTOPLAY TRIGGERED | PLAY |
| DVD Player | SELECTED PROGRAM STARTING | STOP |
| DVD Player | VOICE RING IN | STOP |
| DVD Player | FAX RING IN | NO COMMAND |
| DVD Player | RING IN | STOP |
| DVD Player | PAGE LOADED | NO COMMAND |
| DVD Player | DOWNLOAD COMPLETE | NO COMMAND |
| Audio Player | AUTOPLAY TRIGGERED | STOP |
| Audio Player | SELECTED PROGRAM STARTING | STOP |
| Audio Player | VOICE RING IN | STOP |
| Audio Player | FAX RING IN | NO COMMAND |
| Audio Player | RING IN | STOP |
| Audio Player | PAGE LOADED | NO COMMAND |
| Audio Player | DOWNLOAD COMPLETE | NO COMMAND |
| CD Player | AUTOPLAY TRIGGERED | PLAY |
| CD Player | SELECTED PROGRAM STARTING | STOP |
| CD Player | VOICE RING IN | STOP |
| CD Player | FAX RING IN | NO COMMAND |
| CD Player | RING IN | STOP |
| CD Player | PAGE LOADED | NO COMMAND |
| CD Player | DOWNLOAD COMPLETE | NO COMMAND |
| MPEG Movie Player | AUTOPLAY TRIGGERED | NO COMMAND |
| MPEG Movie Player | SELECTED PROGRAM STARTING | NO COMMAND |
| MPEG Movie Player | VOICE RING IN | STOP |
| MPEG Movie Player | FAX RING IN | NO COMMAND |
| MPEG Movie Player | RING IN | STOP |

TABLE 3-continued

| Application | Key Event | Command |
|---|---|---|
| MPEG Movie Player | PAGE LOADED | NO COMMAND |
| MPEG Movie Player | DOWNLOAD COMPLETE | NO COMMAND |
| Video Capture | AUTOPLAY TRIGGERED | NO COMMAND |
| Video Capture | SELECTED PROGRAM STARTING | NO COMMAND |
| Video Capture | VOICE RING IN | NO COMMAND |
| Video Capture | FAX RING IN | NO COMMAND |
| Video Capture | RING IN | NO COMMAND |
| Video Capture | PAGE LOADED | NO COMMAND |
| Video Capture | DOWNLOAD COMPLETE | NO COMMAND |
| Television Application | AUTOPLAY TRIGGERED | NO COMMAND |
| Television Application | SELECTED PROGRAM STARTING | STOP |
| Television Application | VOICE RING IN | STOP |
| Television Application | FAX RING IN | NO COMMAND |
| Television Application | RING IN | STOP |
| Television Application | PAGE LOADED | NO COMMAND |
| Television Application | DOWNLOAD COMPLETE | NO COMMAND |
| Electronic Program Guide | AUTOPLAY TRIGGERED | NO COMMAND |
| Electronic Program Guide | SELECTED PROGRAM STARTING | START SELECTED PROGRAM |
| Electronic Program Guide | VOICE RING IN | DELAY |
| Electronic Program Guide | FAX RING IN | NO COMMAND |
| Electronic Program Guide | RING IN | DELAY |
| Electronic Program Guide | PAGE LOADED | NO COMMAND |
| Electronic Program Guide | DOWNLOAD COMPLETE | NO COMMAND |
| Telephony | AUTOPLAY TRIGGERED | NO COMMAND |
| Telephony | SELECTED PROGRAM STARTING | NO COMMAND |
| Telephony | VOICE RING IN | ANSWER CALL |
| Telephony | FAX RING IN | FAX ANSWER |
| Telephony | RING IN | NO COMMAND |
| Telephony | PAGE LOADED | NO COMMAND |
| Telephony | DOWNLOAD COMPLETE | NO COMMAND |
| Video Telephone | AUTOPLAY TRIGGERED | NO COMMAND |
| Video Telephone | SELECTED PROGRAM STARTING | NO COMMAND |
| Video Telephone | VOICE RING IN | NO COMMAND |
| Video Telephone | FAX RING IN | NO COMMAND |
| Video Telephone | RING IN | ANSWER |
| Video Telephone | PAGE LOADED | NO COMMAND |
| Video Telephone | DOWNLOAD COMPLETE | NO COMMAND |
| Web Browser | AUTOPLAY TRIGGERED | NO COMMAND |
| Web Browser | SELECTED PROGRAM STARTING | NO COMMAND |
| Web Browser | VOICE RING IN | NO COMMAND |
| Web Browser | FAX RING IN | NO COMMAND |
| Web Browser | RING IN | NO COMMAND |
| Web Browser | PAGE LOADED | NO COMMAND |
| Web Browser | DOWNLOAD COMPLETE | NO COMMAND |

Figure 16:
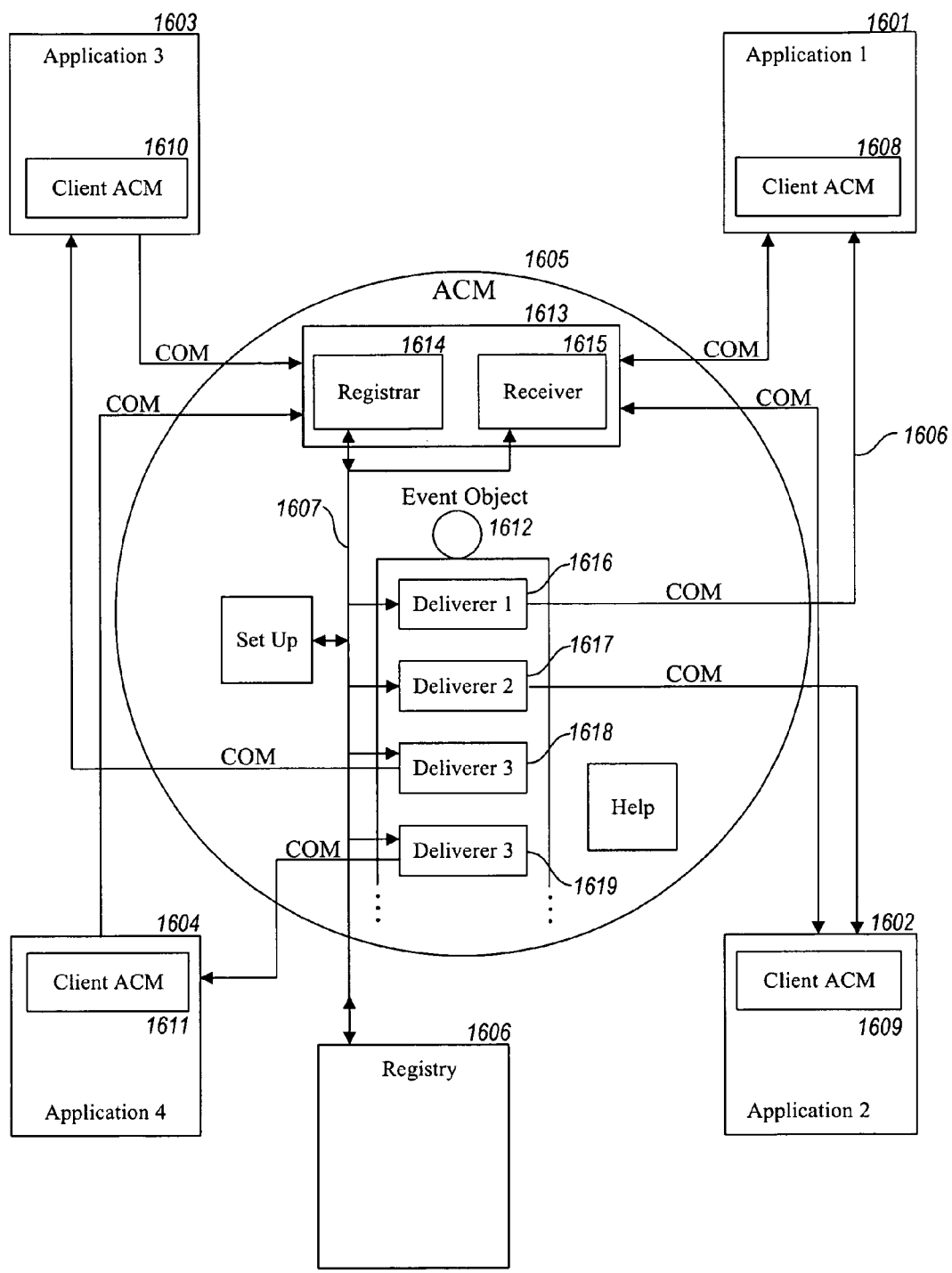
FIG. 16 is a schematic diagram of the application control module and supporting operating system facilities used by the application control module.

FIG. 16 is a schematic diagram of the ACM and supporting operating system facilities used by the ACM. Four interoperating applications 1601–1604 are shown in FIG. 16 interfacing with the ACM 1605. Information regarding the configuration of the cooperative behavior of these application programs is stored in the registry supported by the operating system 1606, as described above. The interconnected single-line arrows 1607 indicate storage and retrieval of configuration information by internal components of the ACM to and from the registry.

The communication between the application programs and various internal components of the ACM are indicated by double-lined arrows, like, for example, arrow 1606. These communications are implemented using the Microsoft COM. COM essentially allows a program to export one or more interfaces to other programs. A interface comprises one or more function pointers through which a process can call a function supported and executed by another process. COM also provides general function calls (i.e., QueryInterface) through which one process can inquire about the interfaces supported by another process and can determine the nature of each function within each interface. Thus, COM allows a process, at run time, to determine the exported functions provided by another running process and to call those functions. COM also allows processes to call other processes running on remote machines. Although the currently described embodiment employs COM, other object models supported by other vendors on other platforms could be utilized for implementing the ACM.

The ACM comprises a number of different, simultaneously-executing threads, a synchronization object, and command receiving and communications logic residing in each of the cooperating applications. That portion of the ACM residing in a cooperating application program is called the client ACM 1608–1611. The client ACM is responsible for sending indications of the occurrence of key events from an application program to internal ACM components. In addition, the client ACM receives commands from other ACM internal components and passes those commands on to the main logic of the application program for execution. The client ACM may be implemented as one or more COM interfaces. For example, the interface exposed to the internal ACM components might consist of a simple "receive_command" function that takes a single integer argument indicating a particular command from the set of commands supported by the associated application. The client ACM might have an additional interface consisting of one function "send_event" that takes a single integer argument and calls an interface function exported by an ACM internal component for receiving a key event from a client ACM. In such an implementation, each key event and each command is uniquely identified by an integer.

The internal components of the ACM include an event object 1612 and a registrar 1614 and a receiver 1615 that execute in a main thread 1613, which is an apartment thread. Apartment threads are associated with a Windows message queue and are obliged to process Windows messages. A free thread, on the other hand, is not associated with the message queue and does not process Windows messages. For each application program, there is a separate free thread running within the main ACM process called a deliverer 1616–1619. The deliverers are queued together on an event queue associated with the event object 1612. In addition, the ACM includes the setup program, described above, and a help program that guides a user through instructions on how to operate the MUI. The setup program and help program can alternatively be considered to be separate programs, apart from the ACM, or considered to be components of the MUI.

The registrar thread within the main thread is responsible for receiving startup notifications from an application, tracking that that application is currently running, and creating and associating a deliverer free thread with that application. Thus, the registrar exports to application programs a COM interface comprising two functions that allow the application program to register itself when it starts up and to unregister itself when it terminates.

The receiver thread running within the main thread is responsible for receiving indications of key events from running application programs. The receiver thread exports to the application programs an interface comprising a single function for receiving key events. Alternatively, the two functions of the registrar and the single function of the receiver can be combined into a single COM interface with three functions.

The event object 1612 is a Microsoft-supported semaphore-like object on which free threads can be queued to wait for the occurrence of a key event and which can be signaled by the receiver thread when the receiver thread receives an event from an application program. When the event object is signaled, the event object sequentially releases each delivered free thread in turn for execution. Each deliverer free thread calls the single function exported by the client ACM for receiving a command, passing to each client ACM the key event that caused the receiver thread to signal the event object. Thus, the ACM operates, in general, as a communication hub into which any application program can pass a notification of the occurrence of a key event. In response to that key event, each application program in the system, including applications that pass in a notification of the occurrence of a key event, receive a command from the ACM indicating the expected response of that application to the key event.

Figure 17:
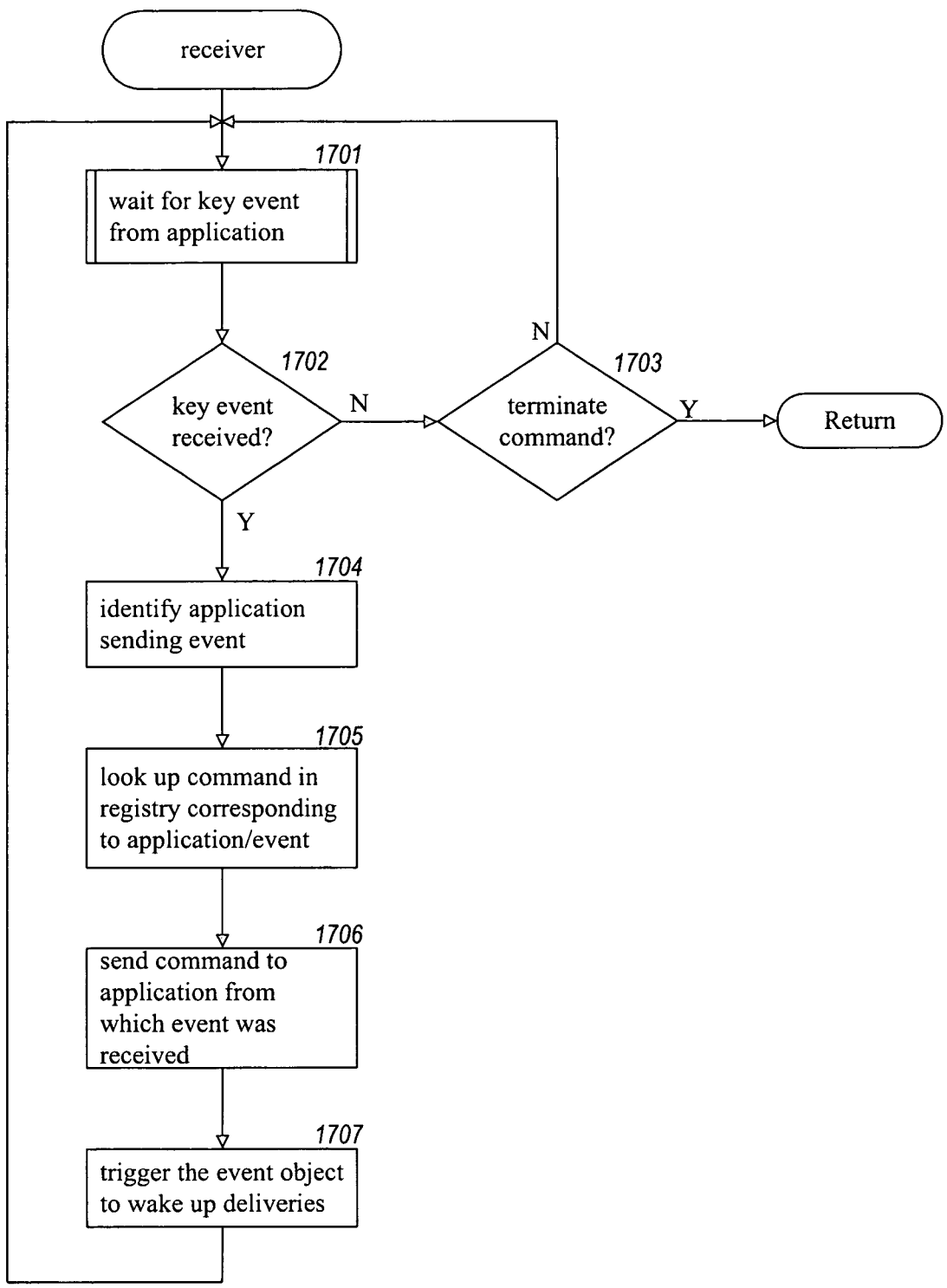
FIG. 17 displays a flow control diagram for the receiver thread of the application control module.

FIG. 17 displays a flow control diagram for the receiver thread of the ACM. In step 1701, the receiver waits for a key event from an application. When the receiver is awakened, the receiver determines, in step 1702, whether a key event has been received. If not, then, in step 1703, the receiver determines whether a terminate command has been received. If so, then the receiver thread returns and terminates. If not, then the control returns to the wait state represented by step 1701. If, on the other hand, a key event has been received, then, in step 1704, the receiver identifies the application that sent the key event, and, in step 1705, looks up the command in the registry that corresponds to this key event for the identified application. In step 1706, the receiver sends the command obtained from the registry to the application from which the key event was received. In step 1707, the receiver triggers the event object in order to wake up all the queued deliverer free threads so that they may deliver commands to the other applications. Note that, in the above described implementation, the deliverer thread associated with the application that sent the key event to the receiver is not awakened, or, alternatively, is awakened but does not send a redundant command to the associated application. Another possible implementation is for the receiver thread to not send a command to the application that sent the key event, but to instead rely on the deliverer thread associated with that application to send the command.

Figure 18:
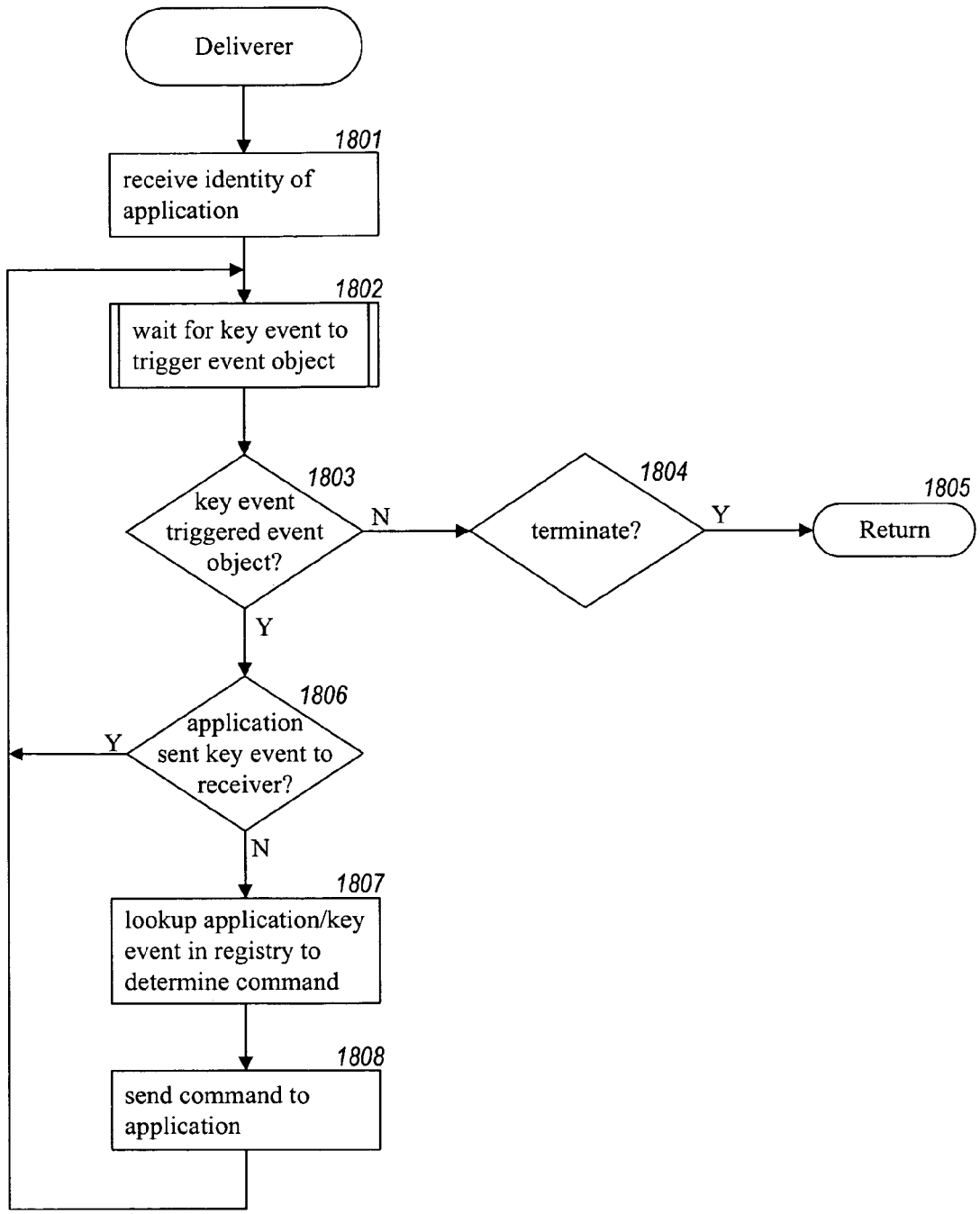
FIG. 18 displays a flow control diagram for the deliverer thread.

FIG. 18 displays a flow control diagram for the deliverer thread. In step 1801, the deliverer thread receives the identity of the application with which it will be associated from the registrar process that launches the deliverer thread. In step 1802, the deliverer enters a wait state, waiting for the event object to be triggered by the receiver thread in response to reception of a key event. Once awakened, the deliverer, in step 1803, determines whether a key event triggered the event object. If not, the deliverer thread determines whether the event object was triggered in order to terminate the deliverer thread. If so, then in step 1805, the deliverer thread terminates execution. If, on the other hand, the event object was triggered by a key event, then, in step 1806, the deliverer determines whether the event object was triggered by a key event sent from the application program with which the deliverer is associated. If so, then control returns to the wait state represented by step 1802, since a command has already been sent to the application program by the receiver thread. If the event object was triggered by an application program other than the application program associated with the deliverer, then, in step 1807, the deliverer looks up the command corresponding to the key event that triggered the event object for the application associated with the deliverer thread and, in step 1707, sends that command to the application program associated with the deliverer thread.

Figure 19:
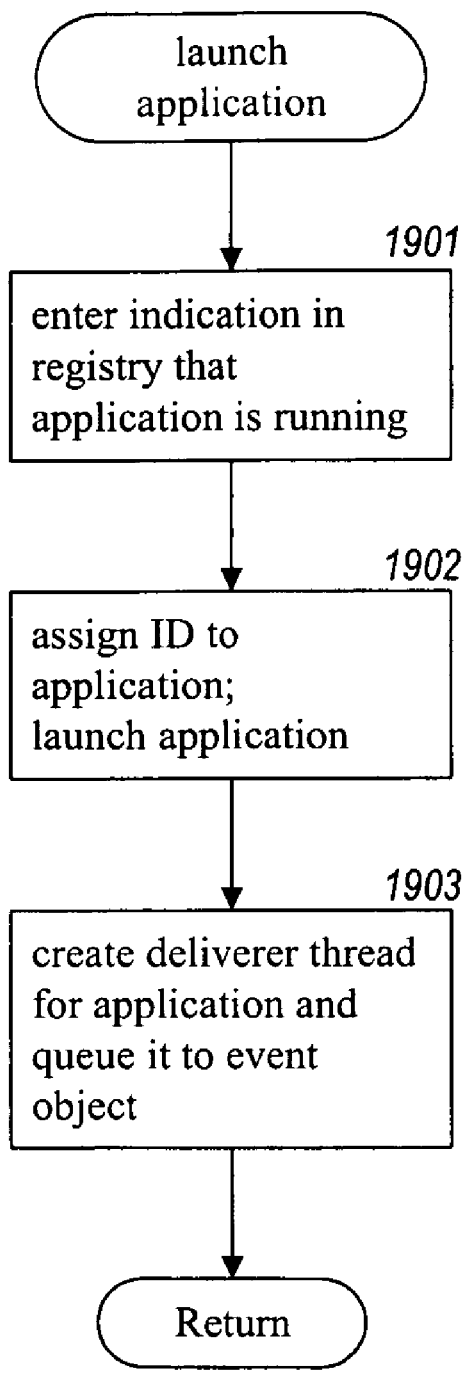
FIG. 19 displays a flow control diagram for the launch program called in response to user input to the main user interface.

FIG. 19 displays a flow control diagram for the launch program called in response to user input to the MUI, described in step 710 of FIG. 7. The launch program may be implemented as a COM function exported by the registrar thread. In step 1901, the registrar thread enters an indication in the registry that the application is running. In step 1902, the registrar assigns an ID to the application and launches the application program through operating system calls. In step 1903, the registrar creates a deliverer, associates the newly created deliverer with the application, and queues the deliverer to the event object. Alternatively, the MUI launches the application programs. Each launched application program registers with the ACM and receives an application identifier. The application program uses the application identifier when it communicates with the ACM. The application programs then unregister with the ACM prior to termination.

Although the present invention has been described in terms of one embodiment, it is not intended that the invention be limited to this embodiment. Modifications within the spirit of the invention will be apparent to those skilled in the art. For example, the ACM and the IAMS can be implemented on top of many different hardware platforms and operating systems, can employ a variety of different remote procedure call facilities for interprocess communications, and can employ a variety of different databases or file system objects for storing configuration information. The tasks supported by the ACM may be divided between internal ACM components in a different fashion and different numbers and types of internal ACM components might be used. The MUI may be differently implemented and have a different style for presenting selections and information to the user. One skilled in the art will appreciate that a compliant application program preferably can execute in a normal manner when the IAMS is not executing. In one embodiment, the ACM may provide a user interface describing the current state of the application programs, such as which application programs are currently executing. The user interface of the ACM may also allow the user to launch application programs and send commands to the application programs. The scope of the present invention is defined by the claims that follow.

What is claimed is:

1. A method in a computer system for management of concurrently running computer application programs, comprising
providing an application control module that includes a registrar, a receiver, a number of deliverers, and an event object, where the registrar and receiver are both apartment threads running within the context of a main control module process and the deliverers are free threads running within the context of a main control module process, and where the application control module runs separately from an operating system and concurrently with at least a first of a plurality of client application programs, the application control module being configured to receive an indication of an occurrence of an event from the first client application program, each of the client application programs being configured with a client application control module that communicates the indication of the occurrence of the event generated or detected by the first client application program to the application control module, wherein at least one of the plurality of client application programs is not configured to respond to the event generated or detected by the first client application program;
mapping the event generated or detected by the first client application program to a corresponding command to be executed by a second client application program, the mapping of the event to the command being stored in a repository accessible by the application control module;
sending the indication of the occurrence of the event from the client application control module for the first client application program to the application control module;
sending an indication from the application control module to the client application control module for the second client application program to execute the corresponding command mapped to the event; and
executing the corresponding command under control of the second client application program.

2. The method of claim 1 wherein providing the mapping from the event to the corresponding command further comprises:
obtaining a list of possible events generated by each client application program;
obtaining a list of commands that can be performed by each client application program; and
providing a user interface through which a user can select the event generated or detected by the first client application programs and select the corresponding command to be performed by the second client application program, and through which the user can map the selected event to the selected command.

3. The method of claim 2 wherein the lists of events and commands are hard-coded in computer code.

4. The method of claim 2 wherein the lists of events and commands are built at run-time by directing inquiries to each client application program through standard interfaces supported by each client application program.

5. The method of claim 2 wherein the repository is a registry, and wherein the lists of events and commands performed by the client application programs are stored by the application control module in the registry and retrieved from the registry by the user interface.

6. The method of claim 1 wherein the repository is a database, and the events and commands are stored, for subsequent retrieval, in the database.

7. The method of claim 1 wherein each client application program that generates an event sends a notification of the occurrence of the event to the control module which then forwards a command for execution to all the concurrently-executing client application programs.

8. The method of claim 7 wherein a computer user chooses one or more commands to be executed by each computer program upon the occurrence of the event from the sets of commands accepted and executed by each of the client application programs.

9. The method of claim 8 wherein the computer user interacts with a main graphical user interface to choose one or more commands to be executed by each client application program upon the occurrence of the event and to launch execution of a selected client application program when it is determined that the selected client application program is not concurrently executing.

10. The method of claim 9 wherein the control module receives notification from the selected client application program when the selected client application program begins to execute and, in response to the received notification, stores an indication that the selected client application program is running and establishes a connection between a client application control module for the selected client application program and the control module for passing notifications of the occurrences of events from the selected client application program to the control module and commands from the control module to the selected client application program.

11. The method of claim 9 further including, within the main process of the control module, executing the registrar, the receiver, and the number of deliverers, one deliverer for each client application program executing within the computer system.

12. The method of claim 11 wherein the registrar accepts notifications of the start of execution and termination of execution from the client application programs and establishes connections between the computer programs and the control module via the client application control module for each client application program; wherein the receiver receives notifications of the occurrences of events from the client application programs, and wherein the deliverers send the indications of the commands to be executed by the client application programs.

13. A system in a computer for coordinating concurrent execution of a number of computer programs, the system comprising:
an application control module that includes a registrar, a receiver, a number of deliverers, and an event object, where the registrar and receiver are both apartment threads running within the context of a main control module process and the deliverers are free threads running within the context of a main control module process, and where the application control module runs separately from an operating system and concurrently with at least a first and a second client application program, the application control module being configured to receive an indication of an occurrence of an event from at least one of the client application programs, where at least one client application program is configured to generate or detect the event and at least one other client application program is not configured to respond to the event;

a repository accessible to the application control module for mapping the event generated or detected by the first client application program to a corresponding command that is to be executed by the second client application program; and a client application control module within the first and second client application programs that is configured to send an indication of the occurrence of the event generated or detected by at least one of the client application programs to the application control module and to receive an indication of command to be executed that is sent from the application control module.

14. The system of claim 13 wherein the computer is a personal computer including the Windows operating system.

15. The system of claim 13 wherein the repository is the Windows Registry.

16. The system of claim 13 wherein the registrar receives notifications from a client application program when it begins to execute, stores an indication that the client application program is running, and creates a deliverer that is associated with the client application program.

17. The system of claim 16 wherein the receiver receives the notification of the event from a client application program.

18. The system of claim 17 wherein each deliverer receives the identity of the event, retrieves from the repository the command to send to the second client application program associated with the deliverer, and sends the retrieved command to the second client application program.

19. The system of claim 13, further including a graphical user interface that allows a computer user to specify for each event, a command to be sent to the second client application program and that allows the computer user to launch the second client application program if it is determined that the second client application program is not running.

20. A computer-readable medium containing computer instructions for coordinating computer programs concurrently executing on a computer system by:

providing an application control module that includes a registrar, a receiver, a number of deliverers, and an event object, where the registrar and receiver are both apartment threads running within the context of a main control module process and the deliverers are free threads running within the context of a main control module process, and where the application control module runs separately from an operating system and concurrently with at least a first of a plurality of client application programs, the application coordination control module being configured to dynamically receive an indication of an occurrence of an event from the first client application program, each of the client application programs being configured with a client application control module that dynamically communicates the indication of the occurrence of the event generated or detected by the first client application program to the application control module, wherein at least one of the plurality of client application programs is not configured to respond to the event generated or detected by the first client application program;

mapping the event generated or detected by the first client application program to a corresponding command that is to be executed by the second client application program; the mapping of the event to the command being in a repository accessible by the application control module;

sending the indication of the occurrence of the event from the application control module for the first client application program to the application control module;

sending an indication from the application control module to the client application control module for the second client application program to execute the corresponding command mapped to the event; and executing the corresponding command under control of the second client application program.

21. The computer-readable medium of claim 20 wherein defined events and commands are stored for subsequent retrieval in a database.

22. The computer-readable medium of claim 20 wherein a computer user is provided with the ability to choose one or more commands to be executed by each client application program upon the occurrence of the event from a set of commands accepted and executed by each of the client application programs.

23. The computer-readable medium of claim 22 wherein the computer user interacts with a graphical user interface to choose one or more commands to be executed by each client application program upon the occurrence of the event and to launch execution of the client application program if it is determined that the client application program is not concurrently running.

\* \* \* \* \*

UNITED STATES PATENT AND TRADEMARK OFFICE
CERTIFICATE OF CORRECTION

Figure 14:
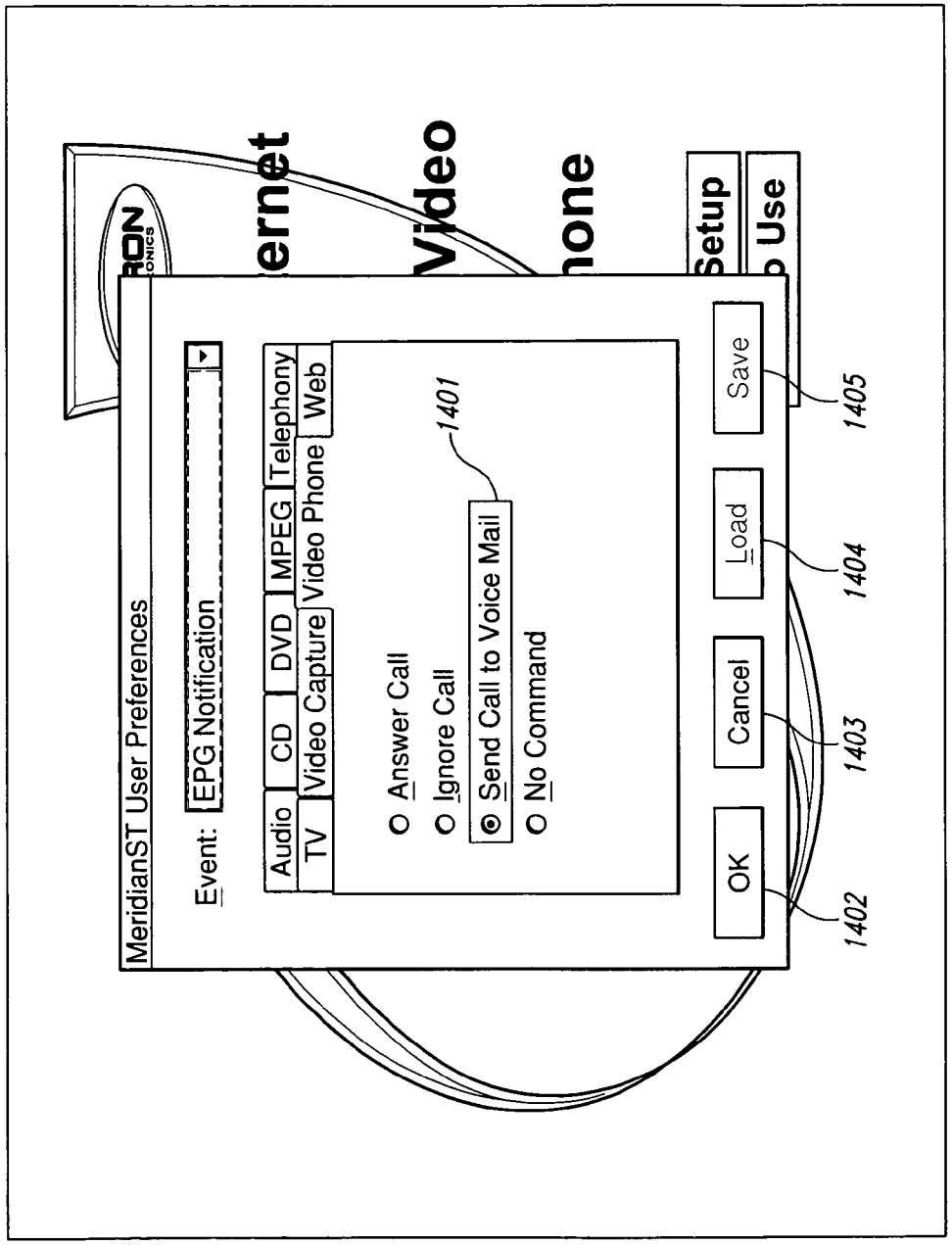
FIG. 14 display selection of a command from a command form.

PATENT NO. : 6,971,109 B1 Page 1 of 1
APPLICATION NO. : 09/122518
DATED : November 29, 2005
INVENTOR(S) : Robert Williams, Robert Hoffman and David M. Weightman It is certified that error appears in the above-identified patent and that said Letters Patent is hereby corrected as shown below:

| Column, Line | Reads | Should read |
|---|---|---|
| Column 3, Line 8 | "FIG. 14 display selection" | --FIG. 14 displays a selection-- |
| Column 17, Line 14 | "indication of command to be executed" | --indication of the command to be executed-- |
| Column 18, Line 3 | "the application coordination con-" | --the application con- -- |

Signed and Sealed this

Twenty-seventh Day of November, 2007

JON W. DUDAS
*Director of the United States Patent and Trademark Office*